United States Patent Office.

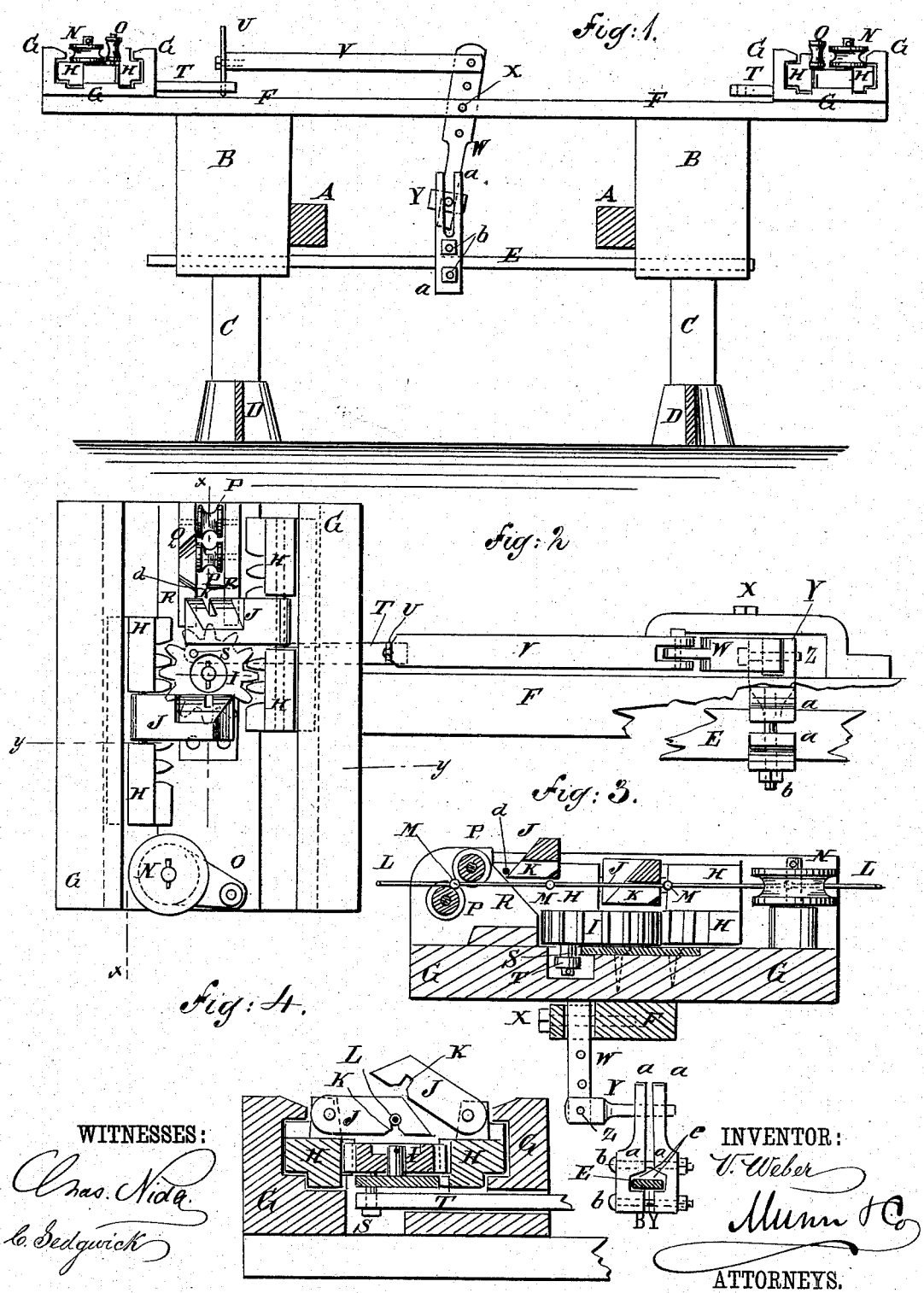

VALENTIN WEBER, OF PRINCEVILLE, ILLINOIS.

CHECK-ROW ATTACHMENT FOR CORN-PLANTERS.

SPECIFICATION forming part of Letters Patent No. 288,528, dated November 13, 1883.

Application filed August 7, 1883. (No model.)

*To all whom it may concern:*

Be it known that I, VALENTIN WEBER, of Princeville, in the county of Peoria and State of Illinois, have invented a new and useful Improvement in Check-Row Attachments for Corn-Planters, of which the following is a full, clear, and exact description.

Reference is to be had to the accompanying drawings, forming a part of this specification, in which similar letters of reference indicate corresponding parts in all the figures.

Figure 1 is a front elevation of my improvement, and showing a part of the planter in sectional elevation. Fig. 2 is a plan view of a part of the same. Fig. 3 is a sectional side elevation of the same, taken through the line $x\,x$, Fig. 2. Fig. 4 is a sectional front elevation of a part of the same, taken through the line $y\,y$, Fig. 2.

The object of this invention is to facilitate the planting of corn in accurate check-row.

The invention consists in a check-row attachment for corn-planters, constructed with a frame having pulleys at its ends to guide the check-wire to and from the attachment, and an inclined guide to raise successively the slotted arms hinged to rack-bars meshing into a crank gear wheel connected with the seed-dropping slide by a series of bars and levers and a clamp, so that the said seed-dropping slide will be operated by the passage of the check-wire through the attachment, as will be hereinafter fully described.

A represents the frame of an ordinary planter; B, the seed-hoppers; C, the spouts to conduct the seed to the ground. D are the runners to open furrows to receive the seed, and E is the seed-dropping slide.

To the hoppers B, or some other suitable support connected with the frame A, is attached a bar, F, the ends of which project at the sides of the planter, and to each of the said ends is attached a frame, G, having upwardly-projecting sides.

In the inner surfaces of the upwardly-projecting sides of the frame G are formed ways, in which slide rack-bars H, the teeth of which mesh into the teeth of the gear-wheel I, pivoted to the middle part of the frame G, between the said rack-bars H.

To the recessed middle parts of each of the rack-bars H is hinged by a pin or other suitable means the outer end of an arm, J, the inner end of which extends nearly to the other rack-bar H. The upper part of the rearward side of the inner end of each of the hinged arms J is beveled to cause it to readily pass beneath the other arm, and the lower edge of the said part is slightly beveled to allow the edge of the other bar to pass beneath it readily.

In the lower sides of the arms J are formed cross-grooves K, of such a size that the check-wire L can slide through them freely, but which will not allow the knots or buttons M of the said check-wire to pass through. The check-wire L passes to the arms J around the grooved pulley N, pivoted to the forward end of the middle part of the frame G, and upon which the said check-wire L is kept in place by a guard-roller, O, attached to the said frame G. The check-wire L, after passing through the grooves of the hinged arms J, passes between the grooved pulleys P, and thus out of the machine. The check-wire L is kept in place upon the pulleys P by a guard, Q, which is recessed to allow the said wire to be readily arranged upon and removed from the said pulleys. The ends of the check-wire L are staked to the ground at the opposite sides of the field in the ordinary manner. With this construction, as the knots M of the check-wire L come in contact successively with the straight forward sides of the arms J, they carry the said arms to the rearward, bringing them in contact with the inclined edge of the guides R, attached to the frame G, a little in front of pulleys P, and by which the said arms are raised off the wire L, allowing the knots M to pass between the said pulleys P, and thus out of the machine, and allowing each raised arm J to pass forward over the other arm, and drop into place in front of the said other arm, and over the check-wire, the said check-wire entering the groove K of the said arm, so that the said arm will be again carried to the rearward by the next knot of the wire.

To the side of the inner incline, R, is attached a pin, $d$, projecting transversely above the check-wire L, to serve as a stop to prevent the said wire L from being raised by the arm J in case the wire should bind in the slot K.

These movements of the arms J give a reciprocating movement to the rack-bars H and the gear-wheel I.

To a crank-pin, S, attached to the lower side of the gear-wheel I, is pivoted the outer end of the connecting-bar T, which is placed in a slot in the frame G. The inner end of the bar T projects at the inner side of the frame G, and has a hole formed in it to receive an end of the cross-pin U, attached to the outer end of the bar V, the other end of which is pivoted to the upper end of the lever W. The lever W passes down through a slot formed in the bar F, or through a keeper attached to the said bar, and is pivoted to the said bar by a bolt, X. Several holes are formed in the lever W, to receive the pivoting-bolt X, so that a longer or shorter stroke can be given to the lower end of the said lever. The lower end of the lever W fits into a slot in the base of the pin Y, and is rigidly secured to the said pin by a bolt, Z. Several holes are formed in the lower part of the lever W, to receive the fastening-bolt Z, so that the pin Y can be adjusted higher or lower, as may be desired. The pin Y passes through a slot in the upper ends of the two bars a, which are fastened together by bolts b. In the inner sides of the lower parts of the bars a are formed recesses c, to receive the seed-dropping slide E, so that by applying the bolts b the said seed-dropping slide E will be clamped between the bars a, and will thus be moved by the movements of the lever W.

I do not abandon or dedicate to the public any patentable features set forth herein and not hereinafter claimed, but reserve the right to claim the same either in a reissue of any patent that may be granted upon this application or in other applications for Letters Patent that I may make.

Having thus described my invention, I claim as new and desire to secure by Letters Patent—

1. A check-row attachment for corn-planters, constructed substantially as herein shown and described, and consisting of the frame G, the pulleys N P, for guiding the check-wire to and from the attachment, the inclined guide R, and the arms J, slotted to receive the check-wire L, and hinged to rack-bars H, meshing into a crank gear wheel, I, connected with the seed-dropping slide by a system of bars and levers and a clamp, as set forth.

2. In a check-row attachment for corn-planters, the combination, with the bar F, attached to the planter, of the frame G, the guide-pulleys N P, the inclined guides R, the hinged arms J, slotted to receive the check-wire L, the rack-bars H, and the gear-wheel I, substantially as herein shown and described, whereby a reciprocating movement will be given to the said rack-bars and gear-wheel by the passage of the check-wire through the attachment, as set forth.

3. In a check-row attachment for corn-planters, the combination, with the bar F of the planter, of the guide-pulleys N P, the inclined guides R, the stop-pin d, the hinged arms J, slotted to receive the check-wire L, the rack-bars H, and the gear-wheel I, substantially as and for the purpose set forth.

4. In a check-row attachment for corn-planters, the combination of the bar F of the planter, the frame G, the guide Q, the guide-pulleys N P, the inclined guides R, one having the stop-pin d, the hinged arms J, slotted to receive the check-wire L, the rack-bars H, and the gear-wheel I, the seed-slide E, lever W, and bars a, connected to the arm Y of the latter and to the said slide, substantially as and for the purpose set forth.

VALENTIN WEBER.

Witnesses:
JOHN D. HAMMER,
FRANK A. WEBER.